US010321178B2

(12) United States Patent
Rai et al.

(10) Patent No.: US 10,321,178 B2
(45) Date of Patent: Jun. 11, 2019

(54) AUTOMATED METHOD FOR SCHEDULING CHANNELS IN AN ABSTRACT TIME DOMAIN

(71) Applicant: Cisco Technology Inc., San Jose, CA (US)

(72) Inventors: Pete Rai, Egham (GB); Trevor Smith, Middlesex (GB); Stephen-John Craig, Maidenhead (GB)

(73) Assignee: Synamedia Limited, Middlesex (GB)

( * ) Notice: Subject to any disclaimer, the term of this patent is extended or adjusted under 35 U.S.C. 154(b) by 70 days.

(21) Appl. No.: 14/202,519

(22) Filed: Mar. 10, 2014

(65) Prior Publication Data

US 2015/0256869 A1 Sep. 10, 2015

(51) Int. Cl.
*H04N 21/262* (2011.01)
*H04N 21/258* (2011.01)
(Continued)

(52) U.S. Cl.
CPC .... *H04N 21/26283* (2013.01); *H04H 20/103* (2013.01); *H04H 60/06* (2013.01);
(Continued)

(58) Field of Classification Search
CPC combination set(s) only.
See application file for complete search history.

(56) References Cited

U.S. PATENT DOCUMENTS

2005/0216934 A1 9/2005 Weinraub et al.
2008/0109857 A1 5/2008 Goodwill et al.
(Continued)

FOREIGN PATENT DOCUMENTS

BR 2009P103488 3/2011

OTHER PUBLICATIONS

Christina M.L. Kelton et al., "Optimal Television Schedules in Alternative Competitive Environments," *European Journal of Operational Research*, vol. 104, pp. 451-473 (Elsevier Science 1998).
(Continued)

*Primary Examiner* — Alexander Gee
(74) *Attorney, Agent, or Firm* — Merchant & Gould P.C.

(57) ABSTRACT

In one embodiment of the present invention, a method implemented on a computing device includes: retrieving a set of channel parameters, the set of channel parameters defining a television channel schedule made of a plurality of viewing time periods; retrieving a set of regional parameters relevant to a geographical area, the set of regional parameters defining at least one regional viewing time period of a first duration; identifying a viewing time period from the plurality of viewing time periods relevant to the at least one regional viewing time period by comparing the regional parameters to the channel parameters; retrieving an abstract schedule associated with the identified viewing time period, where the abstract schedule is a pro forma schedule of programs having a second duration and comprising a set of program content items; and generating a concrete television schedule for the at least one regional viewing time period, where the concrete television schedule is a an instantiated finalized schedule produced by mapping the second duration to the first duration and rearranging the set of program content items of the retrieved abstract schedule.

17 Claims, 7 Drawing Sheets

(51) Int. Cl.
*H04H 20/10* (2008.01)
*H04N 21/2668* (2011.01)
*H04H 60/06* (2008.01)

(52) U.S. Cl.
CPC . *H04N 21/25841* (2013.01); *H04N 21/25891* (2013.01); *H04N 21/2668* (2013.01); *H04N 21/26233* (2013.01); *H04N 21/26241* (2013.01); *H04N 21/26258* (2013.01)

(56) References Cited

U.S. PATENT DOCUMENTS

| | | | | |
|---|---|---|---|---|
| 2009/0049097 A1* | 2/2009 | Nocifera | ............... | G06Q 30/02 |
| 2009/0165044 A1* | 6/2009 | Collet | ............... | H04N 5/44543 |
| | | | | 725/38 |
| 2009/0320072 A1* | 12/2009 | McClanahan | ...... | H04N 5/44543 |
| | | | | 725/47 |
| 2010/0122295 A1* | 5/2010 | Thomas | ................... | H04N 5/76 |
| | | | | 725/44 |
| 2010/0146559 A1* | 6/2010 | Lee | ..................... | H04L 12/1822 |
| | | | | 725/61 |
| 2014/0006951 A1* | 1/2014 | Hunter | ................... | H04H 60/31 |
| | | | | 715/719 |
| 2014/0317666 A1* | 10/2014 | Chiarulli | .............. | H04N 21/235 |
| | | | | 725/114 |
| 2015/0237386 A1* | 8/2015 | Sheehan | ............ | H04N 21/2668 |
| | | | | 725/34 |

OTHER PUBLICATIONS

Srinivas K. Reddy et al., "Spot: Scheduling Programs Optimally for Television," (Sep. 1996).
Department Schedule Validator (DSV), (Duke University 2013).
"Departmental Schedule Validator (DSV)—Data Entry Procedures," (Duke University Jan. 18, 2010).
"Primetime," (Wikipedia Jun. 27, 2013).

* cited by examiner

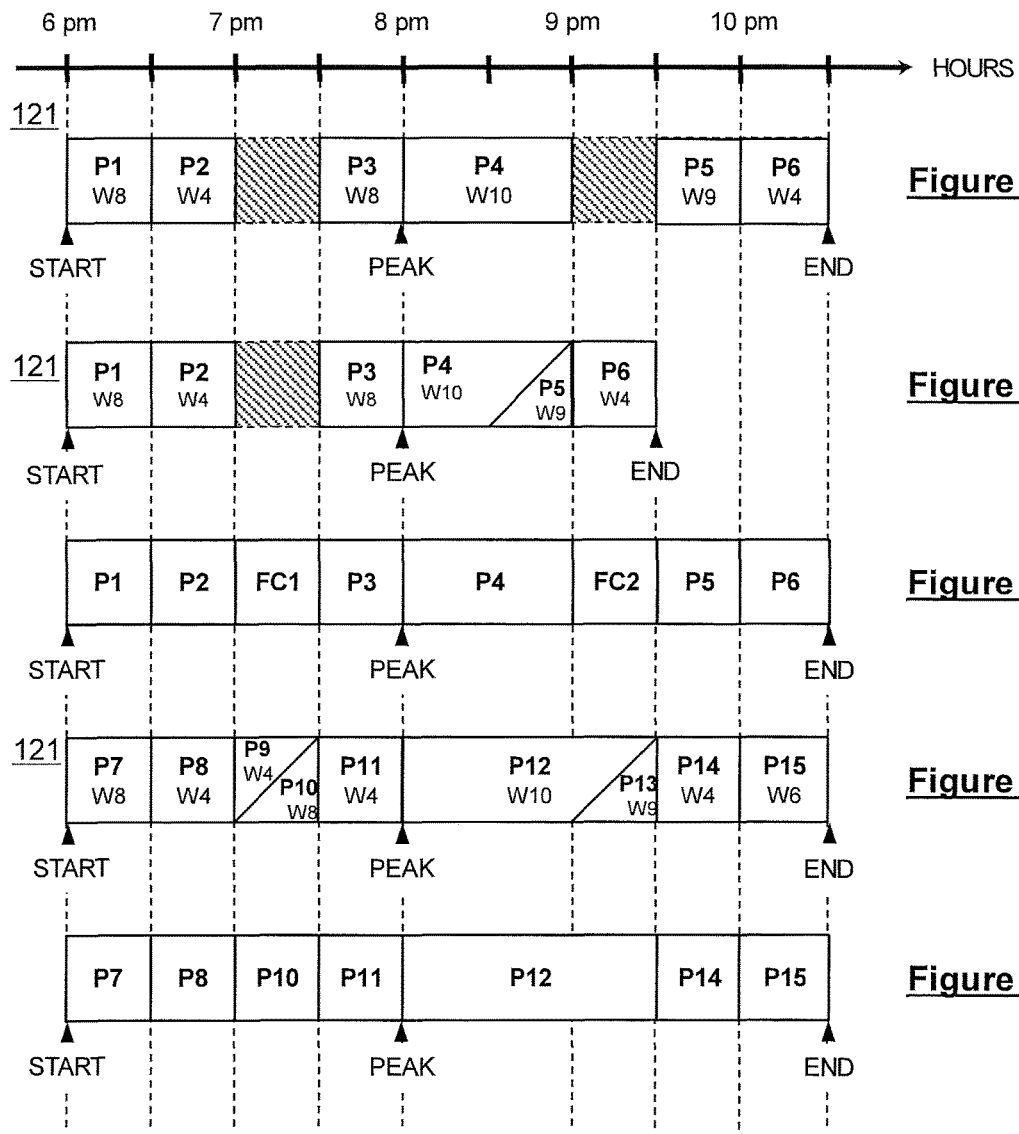

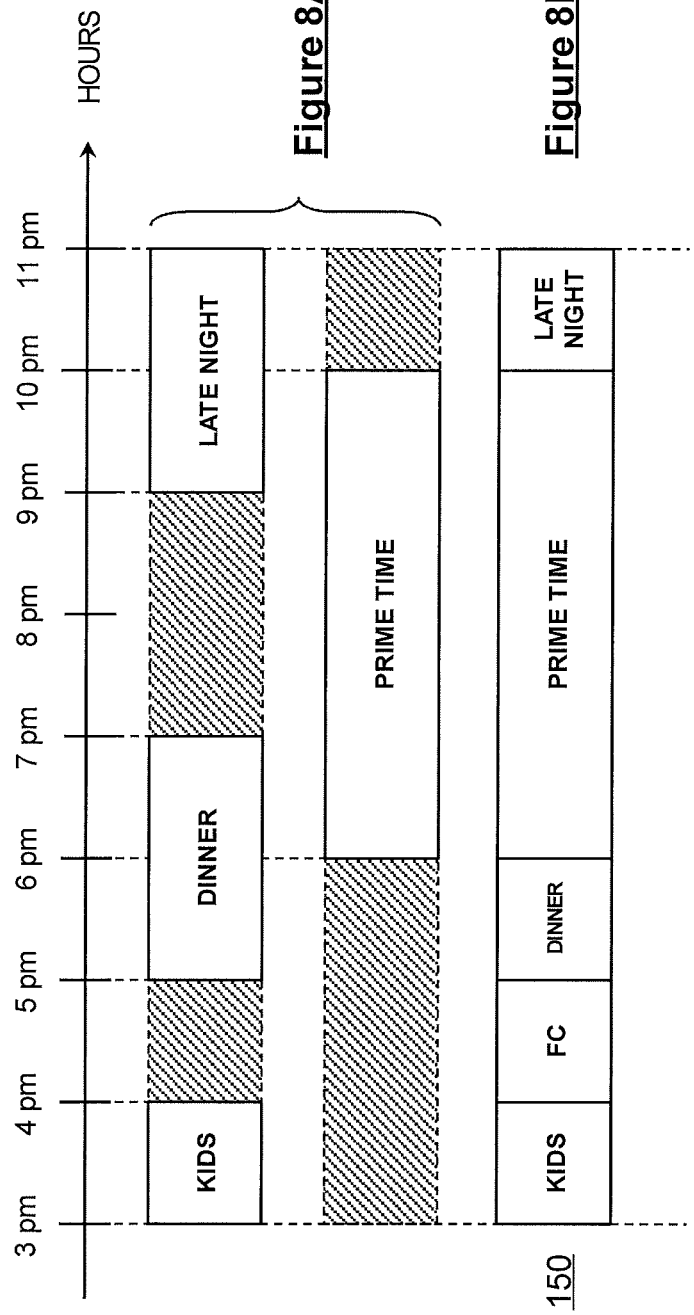

AUTOMATED METHOD FOR SCHEDULING CHANNELS IN AN ABSTRACT TIME DOMAIN

TECHNICAL FIELD

The present invention, in embodiments thereof, relates to methods and apparatus enabling a TV channel scheduler to schedule linear television programs relative to abstract viewing time periods and to map the schedule to local time based on cultural knowledge.

BACKGROUND

Traditional broadcast television program scheduling maps content to linear time. In order to do so, a day is divided into a plurality of viewing time periods based on viewer demographics and on the number of viewers. The most well-known viewing time period is the peak or prime-time period, generally corresponding to the evenings when a high number of viewers are watching. Different viewing time periods may exist throughout a day that typically target different audiences, e.g. kids viewing time periods between 6:00 and 7:00 am and/or 4:00 and 5:00 pm for instance, lunch viewing period 12:00 am to 1:00 pm, etc. These viewing time periods with different related audiences play an important role in choosing time slots for content to maximize the viewer exposure.

BRIEF DESCRIPTION OF THE DRAWINGS

FIGS. 7A to 7E are schematic illustrations showing how scheduling conflicts within a particular regional viewing time period are resolved when generating a concrete television channel schedule in accordance with embodiments of the present invention; and FIGS. 8A and 8B are schematic illustrations showing how scheduling conflicts between different regional viewing time periods are resolved when generating a concrete television channel schedule in accordance with embodiments of the present invention.

DETAILED DESCRIPTION

Overview

Figure 1:
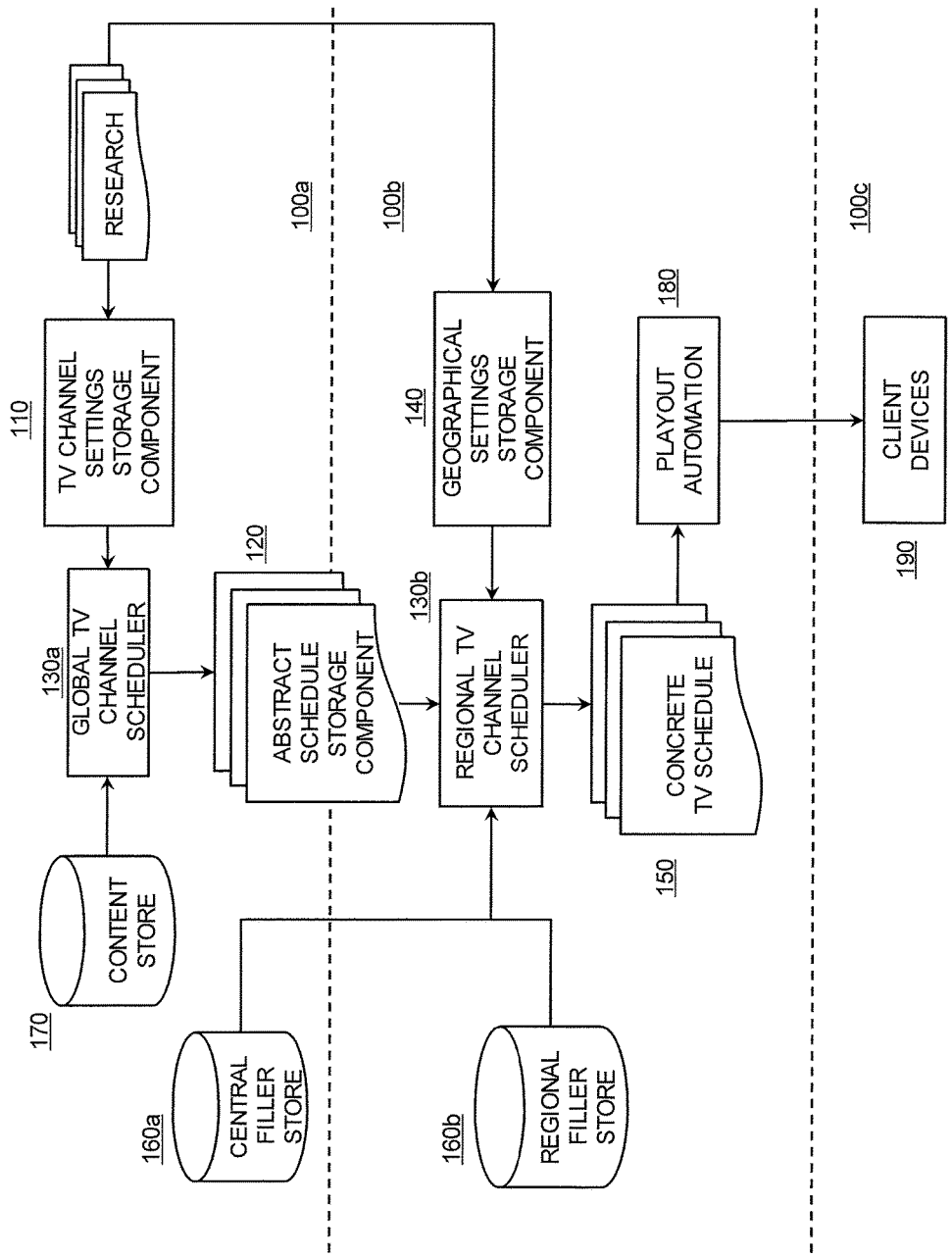
FIG. 1 is a simplified block diagram illustration of a television schedule system constructed and operative in accordance with an embodiment of the present invention.

In one embodiment of the present invention, a method implemented on a computing device includes: retrieving a set of channel parameters, the set of channel parameters defining a television channel schedule made of a plurality of viewing time periods; retrieving a set of regional parameters relevant to a geographical area, the set of regional parameters defining at least one regional viewing time period of a first duration; identifying a viewing time period from the plurality of viewing time periods relevant to the at least one regional viewing time period by comparing the regional parameters to the channel parameters; retrieving an abstract schedule associated with the identified viewing time period, where the abstract schedule is a pro forma schedule having a second duration and comprising a set of program content items; and generating a concrete television schedule for the at least one regional viewing time period, where the concrete television schedule is an instantiated finalized schedule produced by mapping the second duration on the first duration and rearranging the set of program content items of the retrieved abstract schedule.

Exemplary Embodiments

Broadcast programming or scheduling is the practice of organizing television shows or radio programs in a daily, weekly, or season-long schedule. A TV channel scheduler determines when and which TV programs to include in the broadcast scheduling of a particular channel Modern TV schedulers typically use broadcast automation to regularly change the scheduling of their programs to build an audience for a new show, retain that audience, or compete with other broadcasters' programs. Television scheduling strategies are employed to give programs the best possible chance of attracting and retaining an audience. They are used to deliver programs to audiences when they are most likely to want to watch them, and deliver audiences to advertisers in the composition that makes their advertising most likely to be effective. However, in situations where a particular channel is to be broadcast in different regions and/or countries, the TV scheduler may need to take additional constraints, such as time offsets, cultural and audience differences, etc., into consideration.

For example, the concept of viewing time period (e.g. prime time period) may differ between regions because of time zones and cultural differences. Broadcasting television programs worldwide immediately raises issues as the schedule time may only be appropriate for a single time zone. Applying a fixed local time offset may correct nominal time zone differences, but does not necessarily address possible cultural differences. Indeed, prime time period in the United-Kingdom (6:00 pm to 10:30 pm) differs from Spain (10:00 pm to 1:00 am) when compared in local time because of the cultural differences. Furthermore, this time offset correction may result in additional schedule conflicts by having, for example, overlaps between different viewing time periods.

The present invention, in embodiments thereof, describes methods and apparatus enabling a TV channel scheduler to schedule linear television programs relative to abstract viewing time periods and to map the schedule to local time based on cultural knowledge.

Reference is now made to FIG. 1 which is a simplified block diagram illustration of a television schedule system 100 constructed and operative in accordance with an embodiment of the present invention.

The TV schedule system 100 may be split into two main parts, namely a server side comprising central 100a and regional 100b broadcasting facilities, and a client side 100c.

At the central broadcasting facility 100a, a TV channel or platform operator is able to manually define a TV channel schedule, typically based on some research and/or suitable demographics data. As a result, the linear timeline of the TV channel schedule may be divided into distinct viewing time periods of different durations to ease the scheduling of program content items. These viewing time periods may comprise, for example, but without limiting the generality of the invention, kids, lunch, prime time, night, etc. viewing time periods. The viewing time periods definitions and related information may be stored in a TV channel settings storage component 110. Then, central TV channel scheduler 130a selects and schedules program content items stored in a content store 170 for each viewing time period to generate abstract schedules for each defined viewing time period. Abstract schedules are pro forma schedules having a particular duration, but not associated with specific time periods of the day, i.e. abstract schedules have a defined duration, but are not associated with defined start and end times. As will be described hereinbelow, abstract schedules may be adapted to generate instantiated finalized schedules also known as concrete schedules.

Key points may be defined by the TV channel or platform operator for each viewing time period and typically correspond to predefined points in time within the duration of each viewing time period. These key points may include, for example but without limiting the generality of the invention, start, peak and end points for each of viewing time period. The program content items are typically chosen in accordance to the type of viewing time period. For example, program content items selected and placed in a "kids" viewing time period may comprise cartoons, movies, or any other shows or programs suitable to be viewed by such an audience. Similarly, premium program content items may be reserved for prime time viewing periods, i.e. when the number of viewers is more significant. The abstract schedules generated for each viewing time period are stored in an abstract schedule storage component 120 along with metadata retrieved from the TV channel settings storage component 110 and/or transmitted to the regional broadcasting facility 100b by any suitable communications network. These metadata typically characterize each of the viewing time periods—and in turn, each of the abstract schedules—by specifying the audience characteristics (such as the viewers' figures, demographics, etc.), the programs' genres or any other factors relevant to a particular viewing time period.

At the regional broadcasting facility 100b, a TV channel scheduler 130b receives and/or retrieves the abstract schedules from the abstract schedule storage component 120 with the metadata and uses geographical settings to generate concrete TV channel schedules for each geographical region in which the channel is to be broadcast. Concrete TV channel schedules are the instantiated finalized schedules according to which the associated television programming is broadcast. For a particular channel broadcast in a geographical region, the TV channel scheduler 130b retrieves first the geographical settings for that channel from a geographical settings storage component 140. The geographical settings typically include metadata defining regional viewing time periods relevant to the geographical area and their respective durations. These regional viewing time periods may comprise the same or similar viewing time periods as the ones defined for the TV channel, e.g. kids, lunch, prime time, late night, etc. Additionally and/or alternatively, different regional viewing time periods may be defined such as, for example, but without limiting the generality of the invention, news, dinner, breakfast, etc. regional viewing time periods.

The regional TV channel scheduler 130b then compares these regional viewing time periods metadata to the metadata associated with the abstract schedules. When there is a match, the abstract schedule generated for a particular viewing time period is selected to be used for the regional viewing time period. If there is no exact match, the system 100 is configured to identify the most suitable viewing time period (by identifying metadata similarities) corresponding to the regional viewing time period, and the abstract schedule thusly identified as most relevant may be selected for use.

Once an abstract schedule, comprising a set of ordered program content items, has been selected for each regional viewing time period relevant to the geographical area, the regional TV channel scheduler 130b generates a concrete TV channel schedule 150. Generating a concrete TV channel schedule 150 for this particular channel broadcast in the geographical region includes mapping the abstract schedules to their corresponding regional viewing time periods. Mapping an abstract schedule to its corresponding viewing time period typically comprises aligning the duration of the abstract schedule on the duration of the regional viewing time period and in turn, rearranging the set of ordered program content items of the abstract schedule. This may involve using additional parameters provided as part of the TV channel settings and/or geographical settings. Indeed, various scheduling issues may arise at this time. For example, the duration of a regional viewing time period may be different from the one defined in the TV channel settings and therefore may not correspond to the duration of the selected abstract schedule.

It will be appreciated that this may lead to conflicting scheduling issues such as overlaps between program content items in a particular viewing time period or between different viewing time periods. In such a situation, the regional TV channel scheduler 130b may use weighting rules, provided as part of the additional parameters, to resolve these overlaps issues. Conversely, this may lead to having "gaps" in the generated schedule. In such a situation, the regional TV channel scheduler 130b may use the additional parameters to select suitable content from a backup catalogue (e.g. central filler store 160a and/or regional filler store) to fill these gaps. The additional parameters may, for example, but without limiting the generality of the invention, define suitable content to be used, or point to a network address where the suitable content is located, etc.

Finally, after resolving these different scheduling issues, a playout automation component 180 uses the concrete TV channel schedule 150 for that particular channel broadcast in the geographical region to ensure that the program content items are transmitted and played out by the client devices 190 at the right time. The program content items and concrete TV channel schedule 150 are transmitted to a plurality of client devices 190 using any suitable communications network (for sake of simplicity of depiction, only one client device 190 has been drawn on the client device side 100c). Those skilled in the art will appreciate that the system 100 may be configured to repeatedly or simultaneously generate and transmit other concrete TV channel schedules 150 for other TV channels located in a same or a different geographical area. Also, the method described hereinabove may be used by system 100 to generate any type of concrete TV channel schedules 150, i.e. for a daily, a weekly, or even a season-long schedule.

In the above description of FIG. 1, the different blocks are set forth in order to provide a thorough understanding of the various principles of the present invention. However, those skilled in the art will appreciate that not all of these details may necessarily always be required for practicing the present invention or limited to this particular configuration. Accordingly, well-known circuits, control logic, and the details of computer program instructions for conventional algorithms and processes have not been shown in detail in order to avoid obscuring the general concepts unnecessarily. Furthermore, the different components which are, for clarity, described separately (e.g. central and regional filler stores 160*a* and 160*b*, central and regional TV channel scheduler 130*a* and 130*b*, etc.), may also be provided in combination in a single component. Conversely, various components of the invention which are, for brevity, described in a single component (e.g. abstract schedule storage component 120, etc.) may also be provided separately.

Also, it will be apparent to someone skilled in the art that some components or steps described as being located or performed at a particular location (e.g. central broadcasting facility 100*a* or regional broadcasting facility 100*b*) may be located or performed at another location or split between separate locations.

Finally, the different regions are described as geographical areas such as different countries, provinces, etc. However, those skilled in the art will appreciate that these examples are not limiting and that a region may be freely defined by the TV channel and/or platform operator such as any type of geographical sub-region or may even be non-geographical.

Figure 2:
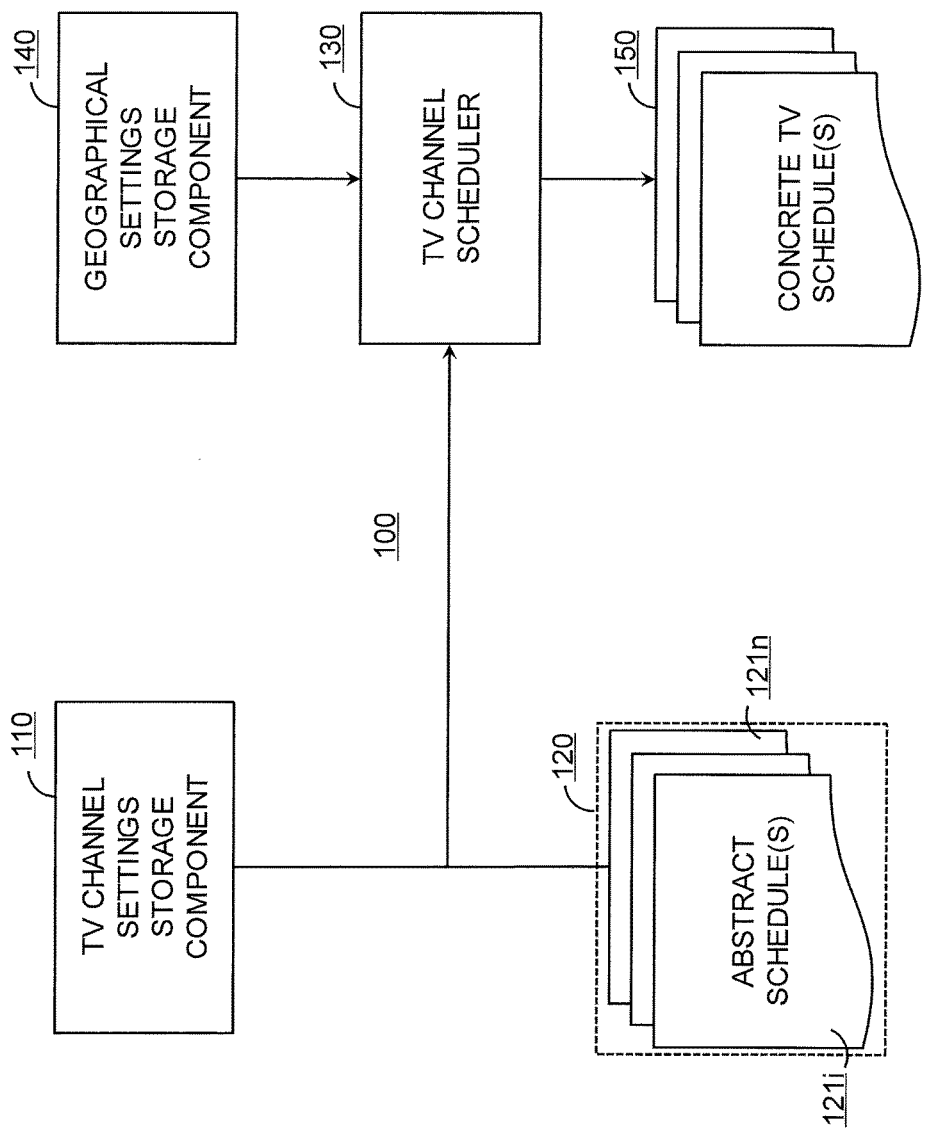
FIG. 2 is a simplified block diagram illustration of a television schedule system constructed and operative in accordance with an embodiment of the present invention.

Reference is now made to FIG. 2 which is a simplified block diagram illustration of a television schedule system constructed and operative in accordance with an embodiment of the present invention.

FIG. 2 is a simplified illustration of the TV schedule system 100 of FIG. 1. It will be appreciated that the TV schedule system 100 of FIG. 2 may generally function in accordance with the same principles as those described hereinabove in relation to FIG. 1. The TV schedule system 100 comprises a TV channel settings storage component 110, an abstract schedule storage component 120, a geographical settings storage component 140, a TV channel scheduler 130—comprising a communication unit (not shown) operable to communicate, retrieve and receive data for the other components and a processor (not shown) operable to process the data—and concrete TV schedules 150. For sake of simplicity, reference will be made to the components of FIG. 2 in the following description.

Figure 3:
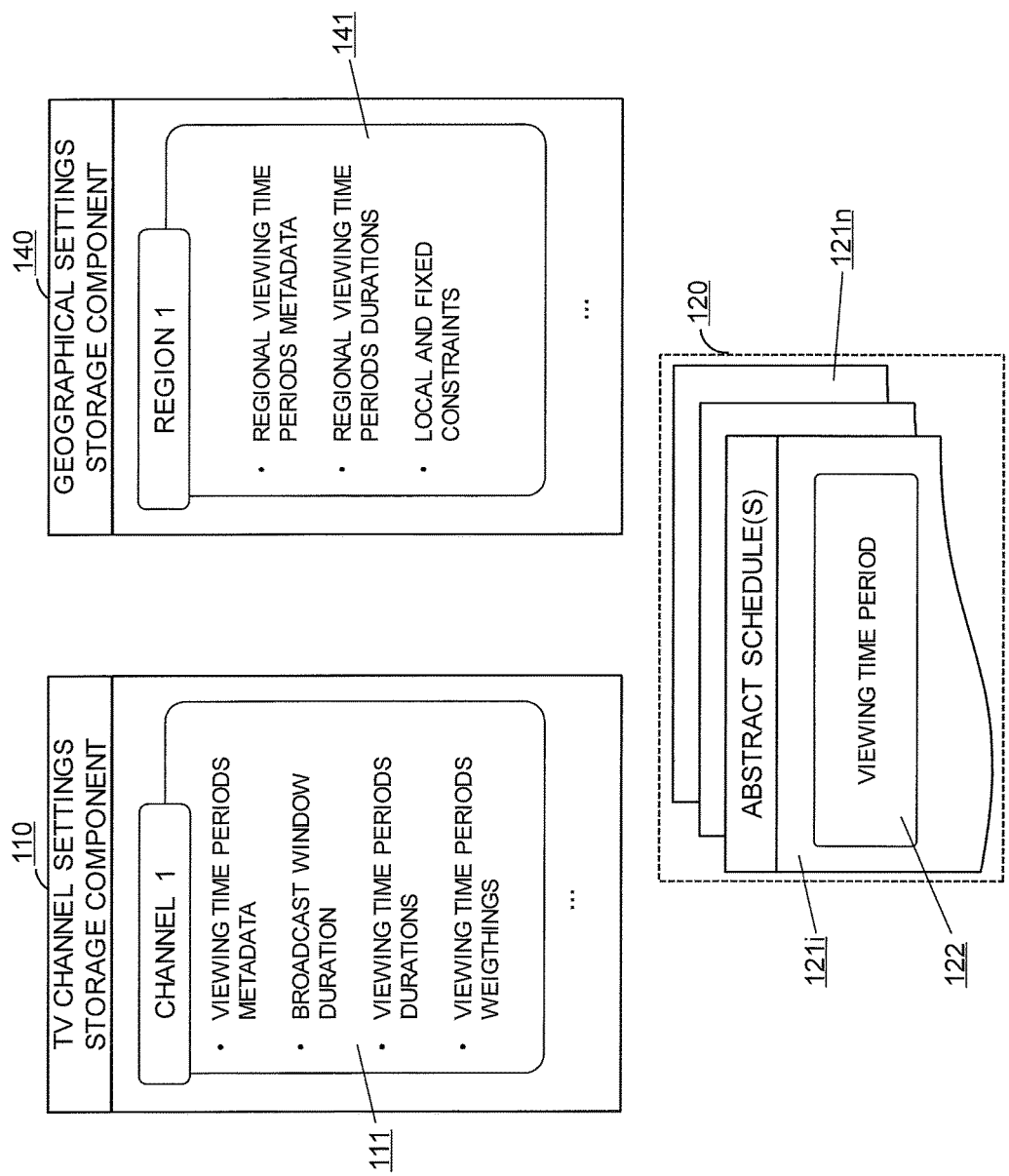
FIG. 3 is a simplified block diagram illustration of a television schedule system constructed and operative in accordance with an embodiment of the present invention.

Reference is now made to FIG. 3 which shows more details about the different components and parameters involved in the process of generating concrete TV channel schedules 150. For the sake of simplicity and depiction, components and parameters relevant to only one TV channel (Channel 1) are shown in FIG. 3. However, it will be apparent to someone skilled in the art that the system 100 may comprise a plurality of components for a plurality of channels and/or a plurality of parameters may be stored in a single or a plurality of components for a plurality of channels.

As explained hereinabove in relation to FIG. 1, a TV channel schedule is divided into a plurality of distinct viewing time periods. A viewing time period is defined to be a period of the day with start and end times (thereby defining a particular duration) and may be defined either by a TV channel or platform operator. Different factors may be used to generate this plurality of viewing time periods. For example, the viewing time periods may be driven by:

- viewers' figures (e.g. "prime time" being defined as the viewing time period with the most available number of viewers and typically corresponds to evenings);
- demographics (e.g. "children" being defined as the viewing time period when children can watch TV, typically before or after school during the week and/or in the mornings during the week-end);
- programs' genre (e.g. "news" being defined as the viewing time period when news are usually broadcast);
- external factor(s) (e.g. "lunch" being defined as the viewing time period when people usually have lunch, typically around midday); and
- any other suitable factor defined by the TV channel or platform operator.

Figure 4:
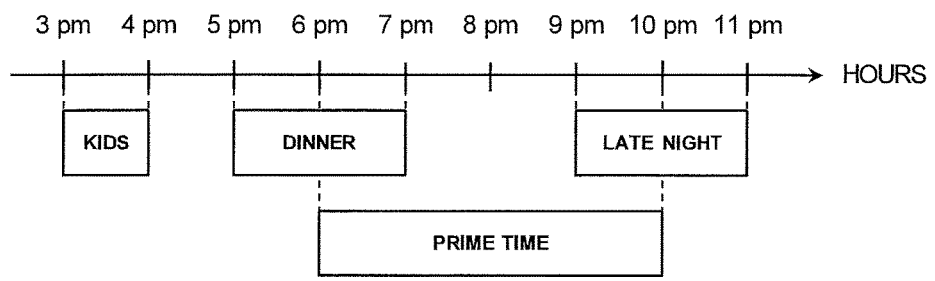
FIG. 4 is a schematic illustration showing different viewing time periods for a particular channel in accordance with an embodiment of the present invention.

These viewing time periods may comprise, for example, but not limited to, "prime time", "kids", "news", "evening", "late night", "sports", "breakfast", "lunch", "dinner", etc. Reference is now made to FIG. 4 which is a schematic illustration showing exemplary different viewing time periods for a particular channel in accordance with an embodiment of the present invention. More specifically, FIG. 4 shows exemplary viewing time periods identified for a particular channel between 3:00 pm and 11:00 pm. Four different viewing time periods are shown:

- "kids" between 3:00 pm and 4:00 pm;
- "dinner" between 5:00 pm and 7:00 pm;
- "prime time" between 6:00 pm and 10:00 pm; and
- "late night" between 9:00 pm and 11:00 pm.

Although FIG. 4 shows only the viewing time periods identified for a particular channel between 3:00 pm and 11:00 pm, those skilled in the art will appreciate that this subset is given for illustration purpose. Indeed a daily, weekly or even season-long TV channel schedule for a particular channel and/or for several channels may be processed. Also, as it is apparent on FIG. 4, one viewing time period may overlap with another one (this is the case between "dinner" and "prime time" viewing time periods as well as between "prime time" and "late night" viewing time periods) and/or gaps may appear between the different identified viewing time periods (e.g. between 4:00 pm and 5:00 pm). These situations are not necessarily problematic and no solution may be needed at this stage.

FIG. 3 also shows a TV channel settings storage component 110. TV channel settings stored in the TV channel settings storage component 110 comprise at least one set of channel parameters 111 relevant to a particular channel (e.g. Channel 1). Those skilled in the art will appreciate that the system 100 may comprise one or more storage component to store a plurality of sets of parameters, each of them typically, although not necessarily, being relevant to one channel. These channel parameters 111 relevant to a particular channel may, for example, comprise the following parameters:

- viewing time periods metadata. These metadata specifically characterize each of the viewing time periods used for the channel by specifying the audience characteristics (such as the viewers' figures, demographics, etc.), the programs' genres or any other factors relevant to a particular viewing time period;
- durations of the overall broadcast window for the channel and of the viewing time periods; and
- weightings for each viewing time period. These weightings are typically useful for managing overlaps between viewing time periods.

It will be appreciated that there may be more than one set of channel parameters 111 per channel. The specific set of channel parameters 111 to be used may be determined on a temporal basis. For example, sets of channel parameters 111 may be provided for different seasons of the year. Summer viewing patterns and preferences, particularly for children, tend to be different than during other seasons. Similarly, a different set of channel parameters may be provided to account for changes in viewing patterns and preferences on the occasion of special events, such as, for example, the World Cup or national elections.

Further, FIG. 3 shows an abstract schedule storage component 120 where the abstract schedules (121i; ...; 121n) generated for each viewing time period of a TV channel are stored. This storage component 120 may be of any suitable form and located in any suitable part of the system 100 of the present invention. Other ways of implementing the storage component 120, such as using a plurality of storage devices, will be apparent to someone skilled in the art. An abstract schedule 121i for one viewing time period 122 comprises an ordered set of program content items scheduled around key points that covers the whole duration of the viewing time period 122 as defined in the channel parameters. The program content items are typically chosen in accordance to the type of viewing type period. For example, program content items selected and placed in a "kids" viewing time period may comprise cartoons, movies, or any other shows or programs suitable to be viewed by such an audience. Similarly, premium program content items may be reserved for prime time viewing periods, i.e. when the number of viewers is the most significant. The TV channel and/or platform operator typically controls the selection and placement of the program content items. Furthermore, the key points around which the program content items are placed may include, for example but without limiting the generality of the invention, start, peak and end points. The peak point of a particular abstract schedule 121i typically corresponds to the point in time where the number of viewers is deemed to be the most important.

Figure 5:
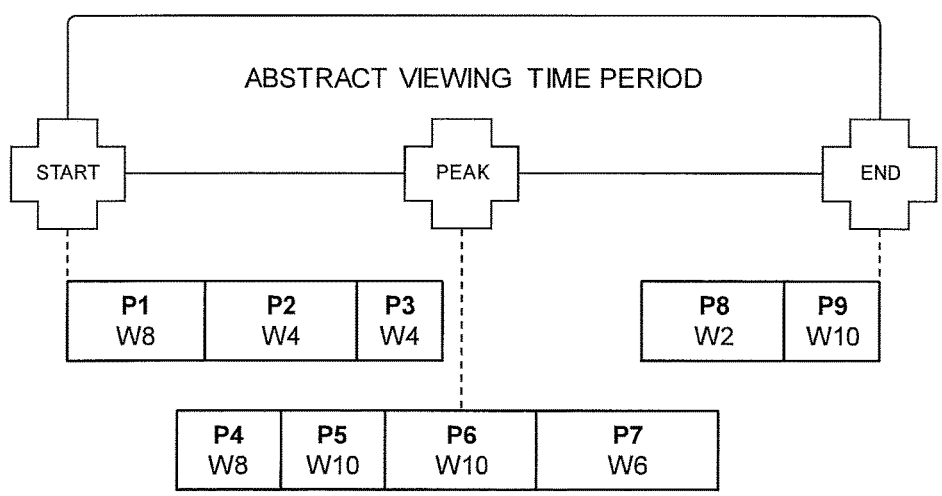
FIG. 5 is a schematic illustration showing an abstract schedule for a particular viewing time period in accordance with an embodiment of the present invention.

Reference is now made to FIG. 5. FIG. 5 is a schematic illustration showing an abstract schedule for a particular viewing time period in accordance with an embodiment of the present invention. Start, peak and end key points may be shown for the viewing time period along with an exemplary ordered set of associated program content items:

Three program content items P1, P2 and P3, have been selected and placed by the TV channel and/or platform operator after the start point: P1 is typically scheduled to be played for a first duration; then P2 will be played for a second duration; and P3 will be played after P2 for a third duration;

Four program content items P4-P7 are placed around the peak point; and

Two program content items P8 and P9 are placed around the end point in such a way that the end of P9 corresponds to the end point.

Also, a weight (W) may be associated with each of the program content items: W8 for P1; W4 for P2; ...; and W10 for P9. These different weights may be assigned by the TV channel and/or platform operator and typically define the importance of the different program content items. These weights may be useful for mapping the abstract schedules (121i; ...; 121n) to the regional viewing time periods and therefore, for generating the concrete TV channel schedule. It will be appreciated that scheduling conflicts may arise during the mapping process in situations where the duration of one abstract schedule 121i does not match the duration of its corresponding regional viewing time period. For example, the duration of the abstract schedule 121i may be longer than the duration of its corresponding regional viewing time period, thereby leading to overlaps between program content items. For instance, as depicted in FIG. 5, P3 may overlap with P4. In such a situation, the program content items weights may be used to resolve this scheduling issue. The respective weights of P3 (W4) and P4 (W8) may be compared and priority may be given to the program content item having the higher weight, i.e. P4.

Additionally and/or alternatively, the TV channel and/or platform operator may associate parameters with each of the program content items. A program content item parameter typically specifies one or more rules applicable to the particular program content item. A rule may be, for example, but without limiting the generality of the invention, that a program content item cannot be placed after or before a program content item of a specific genre (e.g. a premium content item cannot be placed after or before a documentary). Another rule may stipulate that a program content item should be placed after another specific program content item (e.g. a sports pre-game program should be scheduled prior to the start of the relevant game) or that the program content item can only be selected and placed in the TV schedule after a specific time (e.g. some geographical regions may have legal or conventional constraints as to times when adult language may be broadcast). A further rule may be that priority is given to the program content item which has the earliest starting time, etc.

FIG. 3 further shows a geographical settings storage component 140. The geographical settings comprise at least one set of geographical parameters 141 relevant to a particular geographical area (e.g. Region 1). Those skilled in the art will appreciate that the system 100 may comprise one or more storage components to store a plurality of sets of parameters each of them being relevant to one geographical area. These geographical parameters 141 relevant to a particular area (e.g. Region 1) may comprise the following parameters:

regional viewing time periods metadata. These metadata specifically characterize each of the regional viewing time periods used for the geographical area by specifying the audience characteristics (such as the viewers' figures, demographics, etc.), the programs' genres and/or any other factors relevant to a particular regional viewing time period;

durations of the regional viewing time periods as well as mapping to concrete time periods;

local weightings for each of the regional viewing time periods. These local weightings may override the weightings defined in the channel parameters and are therefore useful for managing overlaps between regional viewing time periods; and additional fixed constraints relevant to the particular geographical area such as, for example, but not limited to, legal or conventional constraints regarding restrictions for when adult language may be broadcast.

It will be appreciated that there may be more than one set of geographical parameters 141 associated with a given geographical area. The specific set of geographical parameters 141 to be used may be determined on a temporal basis. For example, different sets of geographical parameters 141 may be provided for different seasons of the year. As discussed hereinabove with respect to channel parameters 111, summer viewing patterns and preferences, particularly for children, tend to be different than during other seasons. Also in countries closer to the poles, viewing patterns for all viewers may be significantly different depending on the amount of sunlight in the day.

Figure 6:
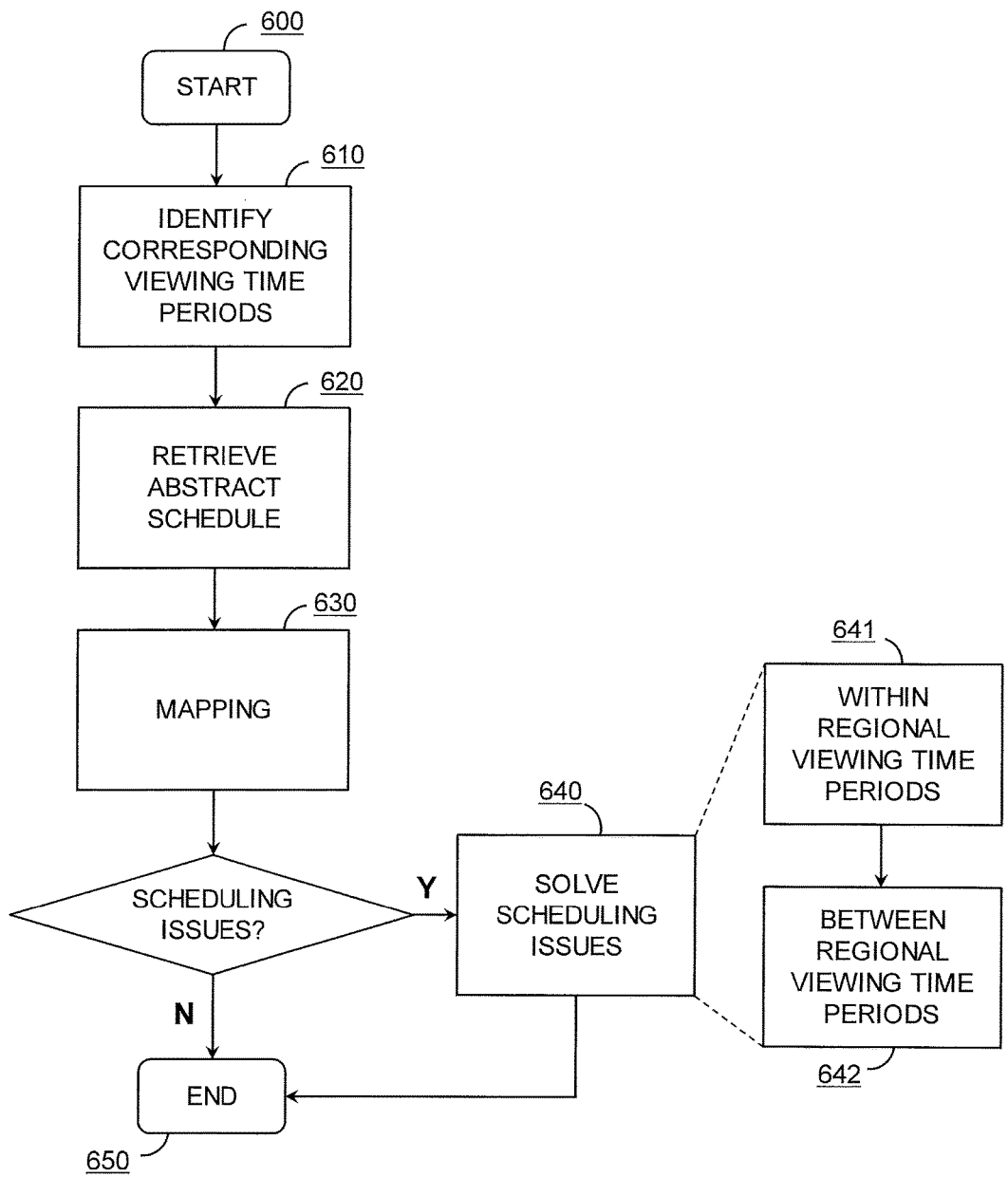
FIG. 6 is simplified flow chart diagram illustrating a concrete TV channel schedule process for generating a concrete television channel schedule for a particular channel broadcast in a particular geographical region in accordance with embodiments of the present invention.

Similarly, different regions may have different holiday schedules based on combinations of both secular and religious holidays. Accordingly, one or more additional sets of geographical parameters 141 may be provided to reflect changing regional viewing patterns and preferences during holiday seasons. Also as discussed hereinabove with respect to channel parameters 111, additional sets of geographical parameters 141 may be provided to reflect viewing patterns and preferences that may be unique to specific days or events, for example, election days and/or significant sporting events such as the Super Bowl, World Cup or Olympics. Reference is now made to FIG. 6 which is a flow chart diagram illustrating a concrete TV channel schedule process for generating a concrete television channel schedule for a particular channel broadcast in a particular geographical region in accordance with embodiments of the present invention. The concrete TV channel schedule process is performed by the TV schedule system 100 and will be described with reference to components of FIGS. 1 and 2.

At step 600, the concrete TV channel schedule process starts and the TV channel scheduler 130 retrieves the set of geographical parameters 141 relevant to a particular geographical area (e. g. Region 1) from the geographical settings storage component 140.

At step 610, the TV channel scheduler 130 retrieves the set of channel parameters 111 relevant to a given channel (e.g. Channel 1) for which a concrete TV channel schedule 150 may be generated from the TV channel settings storage component 110. Then, for each regional viewing time period defined in the regional viewing time periods' metadata, the system 100 searches and identifies a corresponding viewing time period. Metadata for a regional viewing time period may be compared to the viewing time periods' metadata stored in the TV channel settings component 110. If there is a match, the corresponding abstract schedule 121 stored in the abstract schedule storage component 120 may be retrieved for use (step 620). If there is no match, the system may still identify the most suitable viewing time period based on metadata similarities and the corresponding abstract schedule 121 may be retrieved (step 620). This identification process may be performed for each regional viewing time period defined in the regional viewing time periods' metadata.

Once an abstract schedule 121, comprising a set of ordered program content items, is retrieved for each regional viewing time period and is available for use, it is mapped to the regional viewing time period at step 630. Mapping an abstract schedule 121 to a particular regional viewing time period typically involves aligning the start and end points of the abstract schedule 121 on the duration of the regional viewing period as defined in the geographical parameters 141. Furthermore, the peak point may also be adjusted and typically corresponds to the point in time of the regional viewing period where the number of viewers is highest. The metadata relevant to the particular regional viewing time period may be used to specify where to place the peak point within the regional viewing time period. As a result, the initial set of ordered program content items may be rearranged to form an updated set of program content items corresponding to the duration of the regional viewing period. At the end of step 630, a concrete TV channel schedule 150 is thereby generated for a channel broadcast in a particular geographical area.

In a situation where:
all the regional viewing time periods match the viewing time periods in terms of definitions and durations; and
the regional viewing time periods or the viewing time periods cover the whole duration of the broadcast window defined in the channel parameters; and
no scheduling conflicts (e.g. overlaps or holes) exist in the abstract schedules and regional viewing periods;

The concrete TV channel schedule 150 is ready for use and the process ends (step 650). However, in many cases, scheduling conflicts exist and need to be resolved before the generated concrete TV channel schedule 150 may be used. In such cases the process continues to step 640.

Resolution of these scheduling conflicts will be described with relation to the method steps shown in FIG. 6B and will be better understood with the illustrations given in FIGS. 7A-7E and FIGS. 8A-8B to which reference is now also made. FIGS. 7A to 7E are schematic illustrations showing how the scheduling conflicts within a particular regional viewing time period are resolved when generating a concrete television channel schedule in accordance with embodiments of the present invention.

Various scheduling conflicts may arise as results of the mapping process (step 630). Indeed, the duration of a regional viewing time period may not correspond to the duration of the corresponding selected abstract schedule 121, therefore leading to overlaps or gaps between program content items within one regional viewing time period. These types of scheduling issues may be resolved at step 641 of FIG. 6B.

FIG. 7A illustrates a situation where the duration of the regional viewing time period is longer than the duration of the corresponding selected abstract schedule 121. An abstract schedule 121 comprising six different program content items, with different weights, and representing a total duration of three hours and thirty minutes is mapped on a "prime time" regional viewing time period of a total duration of four hours and thirty minutes (from 6:00 pm to 10:30 pm):

Program content items P1—weight 8 (W8) and duration of 30 minutes (30')—and P2 (W4; 30') are aligned on the start point of the "prime time" regional viewing time period (i.e. 6:00 pm);
Program content items P3 (W8; 30') and P4 (W10; 60') are aligned on the peak point of the "prime time" regional viewing time period (i.e. 8.00 pm); and
Program content items P5 (W9; 30') and P6 (W4; 30') are aligned on the end point of the "prime time" regional viewing time period (i.e. 10:30 pm).

This mapping therefore results in gaps (e.g. no program content items scheduled to be played) between 7:00 pm and 7:30 pm, and 9:00 pm and 9:30 pm. At step 641, the system may fill the gaps with additional content such as filler content FC) retrieved from a backup catalogue (i.e. central filler store 160a and/or regional filler store 160b). Those skilled in the art will appreciate that this additional content may be any suitable content (such as audio and/or video data, still pictures, advertisements, program content item, promos, etc.) that may be used for the appropriate duration. The concrete TV channel schedule for this particular "prime time" period will therefore comprise program content items and filler contents (FC1 and FC2) as shown on FIG. 7C.

An intermediate situation (as illustrated in FIG. 7B) would result in having a combination of gaps and overlaps. This typically corresponds to mapping the previous abstract schedule 121 to a "prime time" regional viewing time period of a total duration of three hours and thirty minutes (from 6:00 pm to 9:30 pm). This mapping therefore results in having one gap between 7:00 pm and 7:30 pm and an overlap between 8:30 pm and 9:00 pm. The system will resolve the gap issue as described hereinabove. The overlap issue will be resolved as explained hereinafter with relation to the description of FIG. 7D.

FIG. 7D illustrates an exemplary situation where the duration of the regional viewing time period is shorter than the duration of corresponding selected abstract schedule 121. FIG. 7D shows an abstract schedule 121 comprising nine different program content items, with different weights, representing a total duration of five hours and thirty minutes mapped to a "prime time" regional viewing time period of a total duration of four hours and thirty minutes (from 6:00 pm to 10:30 pm):

Program content items P7 (W8; 30'), P8 (W4; 30') and P9 (W4; 30') are aligned on the start point of the "prime time" regional viewing time period (i.e. 6:00 pm);

Program content items P10 (W8; 30'), P11 (W4; 30') and P12 (W10; 90') are aligned on the peak point of the "prime time" regional viewing time period (i.e. 8:00 pm); and Program content items P13 (W9; 30'), P14 (W4; 30') and P15 (W6; 30') are aligned on the end point of the "prime time" regional viewing time period (i.e. 10:30 pm).

This mapping therefore results in having overlaps between 7:00 pm and 7:30 pm and 9:00 pm and 9:30 pm. At step 641, the system 100 resolves these issues by using the program content items' weights. Typically, the program content item having the highest weight is given priority. In the configuration above, P10 has a higher weight than P9 (W8 being superior to W4) and is therefore selected over P9 to be included in the concrete TV channel schedule for the 7:00 pm-7:30 pm period of the "prime time" regional viewing time period. Similarly, P12 is selected over P14 for the 9:00 pm-9:30 pm time period. The concrete TV channel schedule for this particular "prime time" period will therefore comprise program content items as shown in FIG. 7E. Additionally and/or alternatively, the different rules defined in the program content items parameters may override the programs' weights and may be used to solve these overlap issues. Similarly, the additional fixed constraints relevant to the particular geographical area (e. g. Region 1) of the geographical parameters 141 may override the programs weights and/or the previous rules, and may be used to resolve these overlap issues.

The scheduling conflicts related to program content items for all the regional viewing time periods may be resolved at this stage and, at the end of step 641, concrete TV channel schedules for each regional viewing time period are produced.

The process then continues to step 642. Additional scheduling conflicts may appear for the regional viewing time periods. Indeed, the regional viewing time periods may not have covered the whole broadcast window for the TV channel therefore leaving gaps between some of the regional viewing time periods. Additionally and/or alternatively, one or more overlaps may exist between different regional viewing time periods. These types of scheduling issues may be resolved at step 642 of FIG. 6B.

FIG. 8A shows a subset of a broadcast window for a particular TV channel for which a concrete TV channel schedule 150 needs to be generated. Four different regional viewing time periods—having their own concrete TV schedule obtained as result of step 641—are shown:

"kids" between 3:00 pm and 4:00 pm;
"dinner" between 5:00 pm and 7:00 pm;
"prime time" between 6:00 pm and 10:00 pm; and
"late night" between 9:00 pm to 11:00 pm.

In this example, three scheduling issues exist and need to be resolved. A gap is present between 4:00 pm and 5:00 pm and overlap issues are present between 6:00 pm and 7:00 pm & 9:00 pm and 10:00 pm.

At step 642, the system 100 resolves these issues by applying the same principles as described in relation to step 641. To fill the gap between 4:00 pm and 5:00 pm, the system 100 typically retrieves additional content (FC) of an appropriate duration (one hour) from a backup catalogue (i.e. central filler store 160$a$ and/or regional filler store 160$b$). Resolving the overlap issues may be achieved using the channel parameters 111 and/or the geographical parameters 141. Indeed, the channel parameters 111 stored in the TV channel settings storage component 110 may provide weighting parameters for each of the viewing time periods. These weights may be applied to some or all of the viewing time periods, and priority may typically be given to the viewing time period with the higher weight. Also, the geographical parameters 141 may provide local weights for each of the regional viewing time periods. It will be appreciated that these local weights may be used in combination with the previous weights or may override them. In the latter case, the local weights are used to resolve the overlap issues.

Those skilled in the art will appreciate that further parameters may be used such as the program weights, the rules, and/or the fixed constraints described hereinabove to facilitate the resolving process. As illustrated in FIG. 8B, filler content may be retrieved to fill the gap and priority given to the "prime time" regional viewing time period (over "dinner" and "late night") to resolve the overlap issues. By the end of step 642, the remaining scheduling conflicts for all the regional viewing time periods may be resolved and a concrete TV channel schedule 150 for the TV channel (Channel 1) to be broadcast in a particular geographical region (Region 1) is produced. The process ends at step 650.

Although FIG. 6 describe the mapping process to generate a concrete TV channel schedule 150 for a single particular channel (Channel 1) broadcast in a particular geographical area (e. g. Region 1), those skilled in the art will appreciate that the process may be applied to generate a plurality of concrete TV channel schedules for a plurality of TV channels in a plurality of geographical areas. Also, depending on the different parameters used and applied to resolve the different scheduling issues (for the program content items and the regional viewing time periods), it is possible to employ an automated process to generate a plurality of concrete TV channel schedules for a single TV channel broadcast in a particular geographical area.

In a further embodiment of the present invention, the TV channel scheduler may receive feedback to evaluate the success of the generated concrete TV channel schedule(s). This feedback could be used as part of a feedback loop into both the abstract and concrete scheduling processes to refine the different parameters involved (e.g. weights, rules, metadata defining the regional viewing time periods, etc.) and therefore enhance the TV channel schedule generation process.

For example, the system may be configured to receive ratings reports from viewing rating services such as are known in the art. Weights for given programs may be adjusted in view of how successful the programs are in terms of actual viewership. Similarly, viewing time periods and associated rules may be adjusted based on actual viewership trends.

It will be appreciated that the system may be configured to facilitate such adjustments in an autonomous manner without manual input. Alternatively or in addition, the feedback loop may be configured to provide suggested adjustments that may require manual input before implementation.

It will further be appreciated that the system may be configured to operate the feedback loop iteratively and/or cumulatively, thereby continually fine tuning the scheduling processes in light of actual results. In such manner, trends may be identified that may be used to make adjustments. For example, by comparing feedback iteratively, a given series of programs may be found to receive better ratings when following or preceding another given series of programs. Cumulative processing may find programs that are slowly trending either upwards or downwards. The system may be configured to use such findings to adjust the relevant weights, rules, etc.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

Also, it will be appreciated by persons skilled in the art that the present invention is not limited to what has been particularly shown and described hereinabove. Rather the scope of the invention is defined by the appended claims and equivalents thereof.

The invention claimed is:

1. A method implemented on a regional television channel scheduler computing device comprising:
   retrieving a set of channel parameters, said set of channel parameters characterizing a plurality of viewing time periods included in a television channel schedule for a channel that is broadcast to a plurality of geographical areas;
   retrieving a set of regional parameters relevant to a geographical area of said plurality of geographical areas, said set of regional parameters characterizing at least one regional viewing time period of a first duration and including audience characteristics relevant to said at least one regional viewing time period;
   identifying a viewing time period from said plurality of viewing time periods relevant to said at least one regional viewing time period by comparing said set of regional parameters to said set of channel parameters;
   retrieving an abstract schedule associated with said identified viewing time period, wherein said abstract schedule is a pro forma schedule generated by a central television channel scheduler computing device, having a second duration, and comprising a set of program content items selected by said central television channel scheduler computing device in accordance with particular channel parameters from said set of channel parameters, wherein said particular channel parameters characterize said identified viewing time period, and wherein said central television channel scheduler computing device and said regional television channel scheduler computing device are not co-located;
   generating a concrete television schedule for said at least one regional viewing time period for said geographical area, wherein said concrete television schedule is an instantiated finalized schedule produced by: mapping said second duration to said first duration, and rearranging said set of program content items of said retrieved abstract schedule, wherein said generating a concrete television channel schedule comprises:
   resolving scheduling conflicts arising between different concrete television schedules by updating said rearranged set of program content items of said concrete television schedules wherein said scheduling conflicts comprise an overlap between one or more rearranged set of program content items of different concrete television schedules and a gap between different concrete television schedules wherein resolving the gap between different concrete television schedules comprises retrieving filler content of a suitable duration from a backup catalogue, and
   generating a concrete television channel schedule for said channel broadcast in said geographical area; and
   transmitting the concrete television schedule to a plurality of client devices.

2. The method of claim 1, wherein said retrieving a set of regional parameters, said identifying, said retrieving an abstract schedule and said generating steps are performed for a plurality of regional viewing time periods to generate a plurality of concrete television schedules, each one of said plurality of concrete television schedules being associated with one regional viewing time period and comprising a rearranged set of program content items; and said method further comprises:
   generating a concrete television channel schedule for a channel broadcast in said geographical area using said plurality of concrete television schedules.

3. The method of claim 1, wherein said overlap between said one or more rearranged set of program content items of different concrete television schedules is resolved by using at least one of:
   a weight associated with a viewing time period retrieved from said set of channel parameters;
   a local weight associated with a regional viewing time period retrieved from said set of regional parameters;
   a weight associated with each of said one or more overlapping rearranged program content items, said weight defining an importance of a rearranged program content item;
   a program content item parameter associated with each of said one or more overlapping rearranged program content items, said program content item parameter defining a rule applicable to a rearranged program content item; or
   an additional constraint retrieved from said set of regional parameters.

4. The method according to claim 1 and wherein said retrieving a set of channel parameters comprises: selecting said set of channel parameters from among a multiplicity of said sets of channel parameters, wherein said selecting is performed on a temporal basis.

5. The method according to claim 4 and wherein said temporal basis is in accordance with at least one of a season or a specific event.

6. The method according to claim 1 and wherein said retrieving a set of regional parameters comprises: selecting said set of regional parameters from among a multiplicity of said sets of regional parameters, wherein said selecting is performed on a temporal basis.

7. The method according to claim 6 and wherein said temporal basis is in accordance with at least one of a season or a specific event.

8. The method according to claim 1 and also comprising:
   receiving feedback regarding viewership of said program content items; and
   adjusting at least one of said sets of channel and regional parameters in accordance with said feedback.

9. The method according to claim 8 and wherein said adjusting is performed autonomously.

10. The method of claim 1, wherein said abstract schedule has a duration defined by start and end points; and wherein said set of program content items comprises:
a first set of program content items with a first program content item starting at said start point; and
a second set of program content items with a last program content item finishing at said end point.

11. The method of claim 10, wherein said set of program content items further comprises a third set of program content items placed around a peak point, said peak point being defined in said set of channel parameters and corresponding to a point in time in said identified viewing time period where a number of viewers is the most important.

12. The method of claim 10, wherein said generating a concrete television schedule comprises:
mapping said second duration on said first duration of said regional viewing time period;
resolving scheduling conflicts arising during said mapping by rearranging said set of program content items of said retrieved abstract schedule; and
generating a concrete television schedule for said at least one regional viewing time period.

13. The method of claim 12, wherein said scheduling conflicts comprise one or more of:
an overlap between one or more program content items of different sets of program content items; or
a gap between different sets of program content items.

14. The method of claim 13, wherein said overlap between said one or more program content items of different sets of program content items is resolved by using at least one of:
a weight associated with each of said one or more overlapping program content items, said weight defining an importance of a program content item;
a program content item parameter associated with each of said one or more overlapping program content items, said program content item parameter defining a rule applicable to a program content item; or
an additional constraint retrieved from said set of regional parameters.

15. The method of claim 13, wherein said gap between different sets of program content items is resolved by retrieving filler content of a suitable duration from a backup catalogue.

16. A regional television channel scheduler apparatus comprising:
a communication unit operable to retrieve: a set of channel parameters, said set of channel parameters characterizing a plurality of viewing time periods included in a television channel schedule for a channel that is broadcast to a plurality of geographical areas; and a set of regional parameters relevant to a geographical area of said plurality of geographical areas, said set of regional parameters characterizing at least one regional viewing time period of a first duration and including audience characteristics relevant to said at least one regional viewing time period; and
a processor operable to identify a viewing time period from said plurality of viewing time periods relevant to said at least one regional viewing time period by comparing said set of regional parameters to said set of channel parameters;
wherein said communication unit is further operable to retrieve an abstract schedule associated with said identified viewing time period, wherein said abstract schedule is a pro forma schedule generated by a central television channel scheduler apparatus, having a second duration, and comprising a set of program content items selected by said central television channel scheduler apparatus in accordance with particular channel parameters from said set of channel parameters, wherein said particular channel parameters characterize said identified viewing time period, and wherein said central television channel scheduler apparatus and said regional television channel scheduler apparatus are not co-located;
said processor being further operable to generate a concrete television schedule for said at least one regional viewing time period for said geographical area, wherein said concrete television schedule is an instantiated finalized schedule produced by mapping said second duration to said first duration and rearranging said set of program content items of said retrieved abstract schedule, wherein said processor being operable to generate a concrete television channel schedule comprises said processor being operable to:
resolve scheduling conflicts arising between different concrete television schedules by updating said rearranged set of program content items of said concrete television schedules wherein said scheduling conflicts comprise an overlap between one or more rearranged set of program content items of different concrete television schedules and a gap between different concrete television schedules wherein resolving the gap between different concrete television schedules comprises retrieving filler content of a suitable duration from a backup catalogue, and
generate a concrete television channel schedule for said channel broadcast in said geographical area; and
said processor being further operable to transmit the concrete television schedule to a plurality of client devices.

17. A computer program product comprising one or more non-transitory computer readable media having computer readable program code embodied therein which when executed by a regional television channel scheduler computing device causes:
retrieving a set of channel parameters, said set of channel parameters characterizing a plurality of viewing time periods included in a television channel schedule for a channel that is broadcast to a plurality of geographical areas;
retrieving a set of regional parameters relevant a geographical area of said plurality of geographical areas, said set of regional parameters characterizing at least one regional viewing time period of a first duration and including audience characteristics relevant to said at least one regional viewing time period;
identifying a viewing time period from said plurality of viewing time periods relevant to said at least one regional viewing time period by comparing said set of regional parameters to said set of channel parameters;
retrieving an abstract schedule associated with said identified viewing time period, wherein said abstract schedule is a pro forma schedule generated by a central television channel scheduler computing device, having a second duration, and comprising a set of program content items selected by said central television channel scheduler computing device in accordance with particular channel parameters from said set of channel parameters, wherein said particular channel parameters characterize said identified viewing time period, and wherein said central television channel scheduler computing device and said regional television channel scheduler computing device are not co-located;

generating a concrete television schedule for said at least one regional viewing time period for said geographical area, wherein said concrete television schedule is an instantiated finalized schedule produced by mapping said second duration to said first duration and rearranging said set of program content items of said retrieved abstract schedule, wherein said generating a concrete television channel schedule comprises:

resolving scheduling conflicts arising between different concrete television schedules by updating said rearranged set of program content items of said concrete television schedules wherein said scheduling conflicts comprise an overlap between one or more rearranged set of program content items of different concrete television schedules and a gap between different concrete television schedules wherein resolving the gap between different concrete television schedules comprises retrieving filler content of a suitable duration from a backup catalogue, and generating a concrete television channel schedule for said channel broadcast in said geographical area; and transmitting the concrete television schedule to a plurality of client devices.

\* \* \* \* \*